United States Patent
Fyie et al.

(10) Patent No.: US 8,897,978 B2
(45) Date of Patent: Nov. 25, 2014

(54) METHOD AND SYSTEM FOR PROVIDING A NEUTRAL HOLD MODE IN A SHIFT-BY-WIRE TRANSMISSION

(75) Inventors: Matthew Luke Fyie, Canton, MI (US); Todd Curtis Spaulding, Ann Arbor, MI (US); Brian J Deurloo, Howell, MI (US); Mark Edward Zyskowski, Dearborn, MI (US); William Russell Goodwin, Farmington Hills, MI (US); Charles C Poon, Canton, MI (US); Christopher Lee Danks, Northville, MI (US); Richard Reynolds Hathaway, Livonia, MI (US); Jeffrey James Tumavitch, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 380 days.

(21) Appl. No.: 13/315,848

(22) Filed: Dec. 9, 2011

(65) Prior Publication Data

US 2013/0151095 A1      Jun. 13, 2013

(51) Int. Cl.
| | |
|---|---|
| *G06F 17/00* | (2006.01) |
| *B60W 10/10* | (2012.01) |
| *B60W 10/04* | (2006.01) |
| *B60W 10/18* | (2012.01) |

(52) U.S. Cl.
CPC .............. *B60W 10/10* (2013.01); *B60W 10/04* (2013.01); *B60W 10/18* (2013.01)
USPC .......................................................... 701/62

(58) Field of Classification Search
CPC .............................. B60T 11/10; B60W 10/10
USPC ............................................................ 701/62
See application file for complete search history.

(56) References Cited

U.S. PATENT DOCUMENTS

| | | | |
|---|---|---|---|
| 3,937,105 A | 2/1976 | Arai et al. | |
| 4,892,014 A * | 1/1990 | Morell et al. | ................... 477/92 |
| 5,522,776 A | 6/1996 | Alvey | |
| 5,656,868 A | 8/1997 | Gottlieb et al. | |
| 6,139,468 A | 10/2000 | Goates et al. | |
| 6,151,977 A | 11/2000 | Menig et al. | |
| 6,345,224 B1 | 2/2002 | Schumacher et al. | |
| 7,156,218 B2 | 1/2007 | Yamamoto | |
| 7,216,025 B2 | 5/2007 | Keyse et al. | |
| 7,681,703 B2 | 3/2010 | Bachmann et al. | |
| 8,301,348 B2 * | 10/2012 | Nagashima et al. | ............ 701/58 |
| 8,515,635 B2 | 8/2013 | Spaulding et al. | |
| 8,521,378 B2 | 8/2013 | Steinhauser et al. | |
| 8,688,339 B2 | 4/2014 | Fyie et al. | |
| 2004/0173431 A1 | 9/2004 | De Vore et al. | |
| 2009/0111647 A1 | 4/2009 | Hecht et al. | |
| 2009/0111648 A1 | 4/2009 | Hecht et al. | |
| 2009/0111649 A1 | 4/2009 | Hecht et al. | |
| 2009/0111654 A1 * | 4/2009 | Hecht et al. | ................... 477/195 |
| 2009/0287383 A1 | 11/2009 | Fujii et al. | |
| 2011/0291822 A1 * | 12/2011 | Boston et al. | ............... 340/425.5 |

\* cited by examiner

*Primary Examiner* — John Q Nguyen
*Assistant Examiner* — Michael Kerrigan
(74) *Attorney, Agent, or Firm* — Diederiks & Whitelaw, PLC

(57) ABSTRACT

A method and system provides a Neutral Hold mode in a vehicle having a shift-by-wire transmission with a return to park feature. The Neutral Hold mode is entered upon detecting when the transmission control mechanism has been used a first time to select Neutral when a driver's door is open or has been used a second time to select Neutral. When in Neutral Hold mode, the transmission will stay in Neutral and not shift to Park upon detecting that a driver has exited the vehicle.

17 Claims, 4 Drawing Sheets

METHOD AND SYSTEM FOR PROVIDING A NEUTRAL HOLD MODE IN A SHIFT-BY-WIRE TRANSMISSION

BACKGROUND OF THE INVENTION

1. Field of Invention

The present invention pertains to the field of automatic transmissions for motor vehicles and, more particularly, to a method and system for providing a Neutral. Hold mode in a shift-by-wire transmission.

2. Background of the Invention

A traditional automatic transmission includes a transmission control device employed to control the transmission of a motor vehicle. The transmission control device is used to select several ranges, such as Park, wherein the transmission is locked to prevent the vehicle from moving, Neutral, wherein the transmission allows the vehicle to be moved freely, such as when being towed, Reverse, wherein the transmission allows the vehicle to move backwards, and one or more Drive ranges that enable forward motion of the vehicle. Usually, the transmission control device is in the form of a lever connected with a mechanical connection, such as a cable or a hydraulic line, to the transmission. Typically, the lever is also connected to an indicator. As the transmission control mechanism is moved from one range to another, the mechanical connection physically shifts the transmission to the selected range and the indicator moves to show the driver which range has been selected. Even if the vehicle is turned off, the driver is able to determine the current transmission range from the indicator and, in some cases, is able to move the transmission control mechanism to Neutral if, for example, the vehicle is to be towed.

The traditional automatic transmission utilizes multiple friction elements for automatic gear ratio shifting. Broadly speaking, these friction elements may be described as torque establishing elements although more commonly they are referred to as clutches or brakes. The friction elements function to establish power flow paths from an internal combustion engine to a set of vehicle traction wheels. During acceleration of the vehicle, the overall speed ratio, which is the ratio of a transmission input shaft speed to a transmission output shaft speed, is reduced during a ratio upshift as vehicle speed increases for a given engine throttle range. A downshift to achieve a higher speed ratio occurs as an engine throttle range increases for any given vehicle speed, or when the vehicle speed decreases as the engine throttle range is decreased. Various planetary gear configurations are found in modern automatic transmissions. However, the basic principle of shift kinematics remains similar. Shifting an automatic transmission having multiple planetary gearsets is accompanied by applying and/or releasing friction elements to change speed and torque relationships by altering the torque path through the planetary gearsets. Friction elements are usually actuated either hydraulically or mechanically based on the position of the transmission control device.

In a shift-by-wire transmission arrangement, the mechanical connection between the transmission control device and the transmission is eliminated. Instead, the transmission control device transmits an electrical signal along a wire to an electronic controller, which directs separate actuators to apply or release the various friction elements to obtain a desired gear ratio. The control device is no longer necessarily in the form of a lever because the control device is no longer moving a mechanical connection for controlling the transmission. Instead, the control device is typically an electro-mechanical interface (e.g., series of buttons, lever or knob) that is used to instruct the transmission to switch between the transmission ranges. An electronic display, powered by a battery on the vehicle, is typically employed to indicate the current range for the transmission and must be on, and thus drawing power, in order for the driver to know which range has been selected.

Many vehicles with a shift-by-wire transmission incorporate a "Return to Park" feature to automatically shift the transmission into Park. See, for example, U.S. Pat. Nos. 3,937,105, 4,892,014 and 7,156,218. Such a feature is activated when certain triggering events occur, for example, when the system detects a seat belt being unbuckled while a driver door is opened when the vehicle is traveling below a calibrated speed, or when the ignition is turned off. Automatically shifting the transmission into Park prevents unwanted motion of the vehicle.

While such a feature is helpful under most driving conditions, the feature is not helpful when the driver would like to exit the vehicle and have the vehicle remain in Neutral. Many car washing facilities are designed to pull a vehicle through a car wash machine on a conveyor. The driver simply drives the vehicle onto the conveyer, leaves the transmission in neutral and then exits the vehicle. The vehicle is then washed as the vehicle is pulled through the car washing machine. However, if the vehicle automatically shifts to Park as soon as the driver exits the vehicle, both the vehicle and the conveyor may suffer damage.

As can be seen by the above discussion, there is a need in the art for a system that allows a vehicle with a shift-by-wire transmission to be placed in a mode which maintains Neutral without a driver present such as when the vehicle is carried by a conveyor during washing.

SUMMARY OF THE INVENTION

The present invention is directed to a system for providing a Neutral Hold mode for a shift-by-wire transmission that is placed in various shift ranges such as Park, Drive, and Neutral and has an, automatic Return to Park feature for shifting the transmission to Park when the vehicle is traveling at an extremely low speed or in a stopped condition as a driver prepares to exit the vehicle. The system includes a transmission control mechanism for determining which of the transmission ranges or modes is desired by the driver. A controller is used to receive information from various sensors, such as a door opening sensor, a seat belt sensor, an ignition switch sensor and the transmission control mechanism to determine when to shift the transmission into the various ranges and modes.

According to a preferred embodiment of the invention, the Neutral Hold mode keeps the transmission from automatically shifting to Park for relatively short periods of time in order to allow the vehicle to be moved such as when on a conveyor of a car washing machine. Preferably, there are several methods of entering the Neutral Hold mode. In a first preferred method, the mode is entered when the controller receives a signal from a detector sensing when the transmission control mechanism has been used to select Neutral a second time, i.e., twice in a row. After detecting when a transmission control mechanism has been used to select neutral a first time, a display will display a message requesting that the transmission control mechanism be employed to select neutral a second time and when a second selection of Neutral is detected then the Neutral Hold mode is entered. In a second preferred method, the controller is configured to enter a Neutral Hold mode upon detecting that the door is open or the engine is off when the transmission control mechanism is used to select 'Neutral".

The controller is configured to maintain the transmission in Neutral and not shift the transmission to park upon detecting that a driver has exited the vehicle and a display displays a message when the system has entered the Neutral Hold mode. The controller is configured to cease displaying the message upon detecting that a battery is providing power below a threshold level and the controller configured to maintain the Neutral Hold mode when the battery ceases to provide power. The system will leave the Neutral Hold mode when the transmission control mechanism is used to select a range other than Neutral.

Additional objects, features and advantages of the present invention will become more readily apparent from the following detailed description of preferred embodiments when taken in conjunction with the drawings wherein like reference numerals refer to corresponding parts in the several views.

DETAILED DESCRIPTION OF PREFERRED EMBODIMENTS

Figure 1:
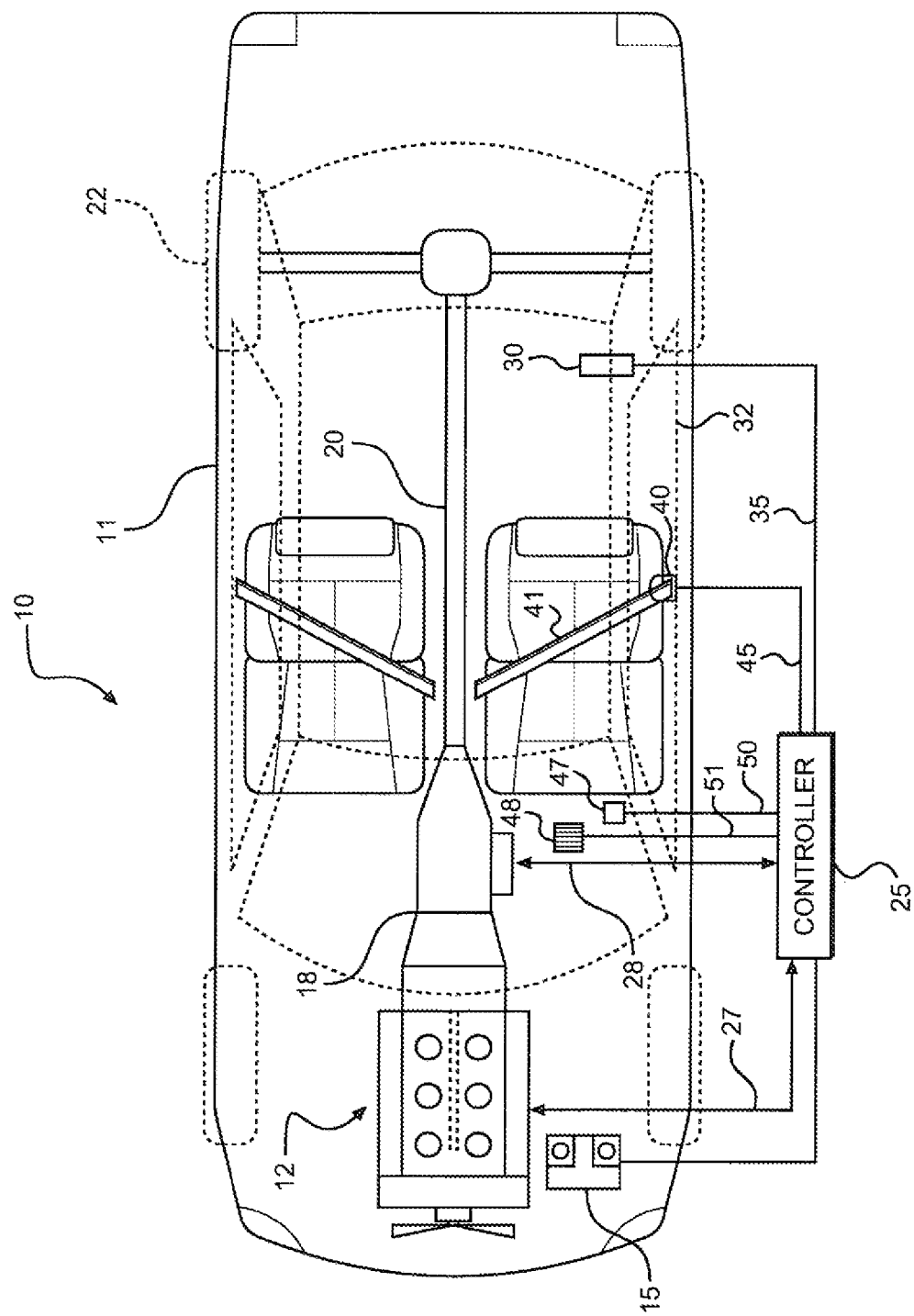
FIG. 1 is a diagram showing a vehicle incorporating a system for providing a Neutral Hold mode in a shift-by-wire transmission in accordance with the invention.

With initial reference to FIG. 1, there is shown an automotive vehicle 10 having a body 11 and an engine 12 with a battery 15. Power from engine 12 is transmitted to a transmission 18, then to the other portions of a powertrain 20 and eventually to drive wheels 22. Vehicle 10 is shown as a rear wheel drive vehicle but any type of powertrain arrangement, including front wheel or all wheel drive systems, could be employed. In addition, although engine 12 is shown as an internal combustion engine, other types of drive arrangements, including hybrid drive systems, could be utilized. A controller 25 is connected to engine 12 and transmission 18 by communication lines 27 and 28 respectively. Controller 25 uses inputs from several sources to obtain information used to control engine 12 and transmission 18. For example, controller 25 is connected to a driver door sensor 30, for determining if a driver door 32 is open, by communication line 35. A seat belt sensor 40 determines if a seat belt 41 is fastened and is also connected to controller 25 through a communication line 45. An ignition switch 47 and a brake sensor 48 are connected to controller 25 through lines 50 and 51 respectively.

Figure 2:
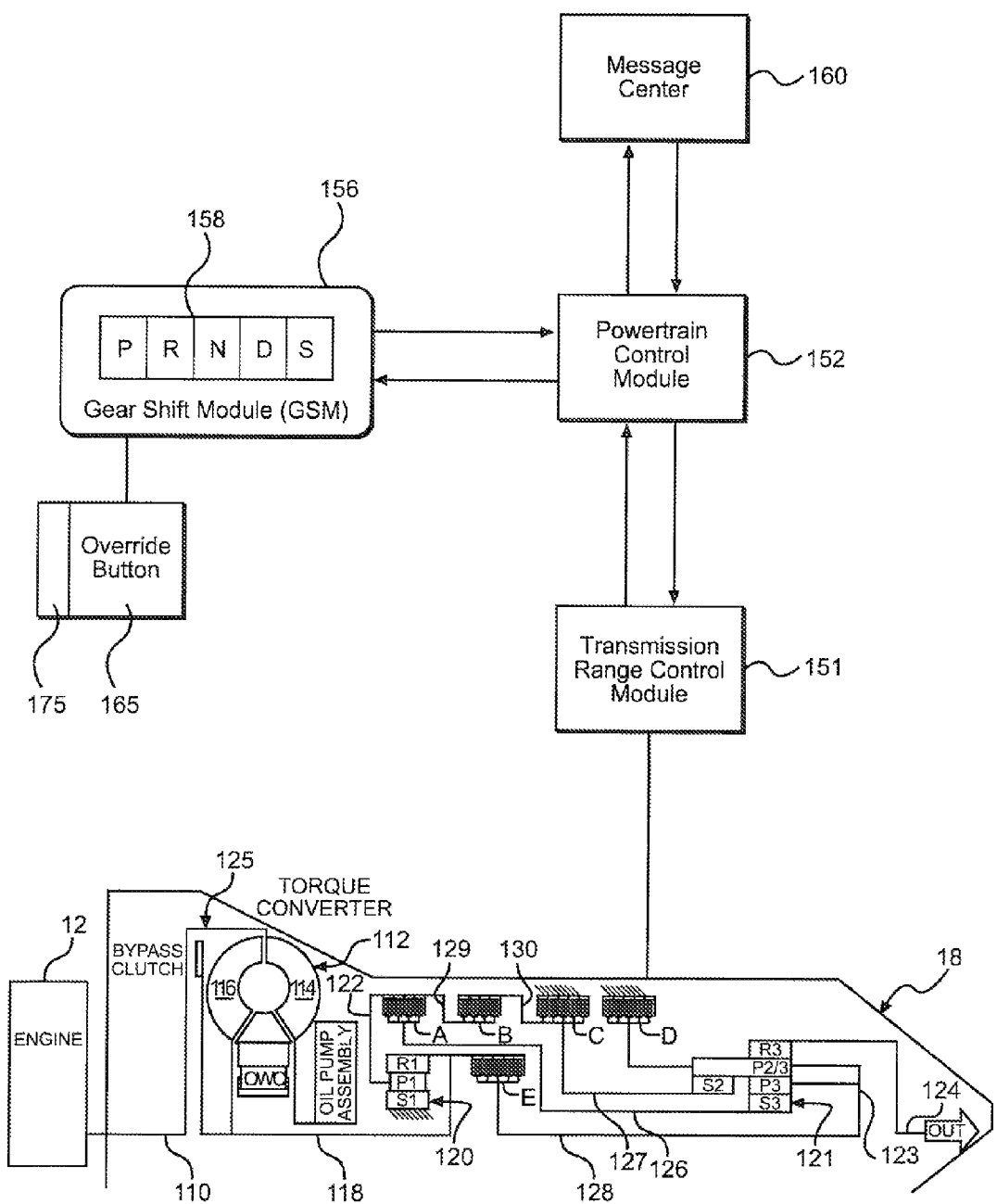
FIG. 2 is a basic schematic diagram of the system in FIG. 1.

FIG. 2 shows more details of transmission 18, which is an example of a multiple-ratio transmission wherein ratio changes are controlled by friction elements acting on individual gear elements. Engine torque from engine 12 is distributed to torque input element 110 of hydrokinetic torque converter 112. An impeller 114 of torque converter 112 develops turbine torque on a turbine 116 in a known fashion. Turbine torque is distributed to a turbine shaft, which is also transmission input shaft 118. Transmission 18 is shown to include a simple planetary gearset 120 and a compound planetary gearset 121. Gearset 120 has, a permanently fixed sun gear S1, a ring gear R1 and planetary pinions P1 rotatably supported on a carrier 122. Transmission input shaft 118 is drivably connected to ring gear R1. Compound planetary gearset 121, sometimes referred to as a Ravagineaux gearset, has a small pitch diameter sun gear S3, a torque output ring gear R3, a large pitch diameter sun gear S2 and compound planetary pinions. The compound planetary pinions include long pinions P2/3, which drivably engage short planetary pinions P3 and torque output ring gear R3. Long planetary pinions P2/3 also drivably engage short planetary pinions P3. Short planetary pinions P3 further engage sun gear S3. Planetary pinions P 2/3, P3 of gearset 21 are rotatably supported on compound carrier 123. Ring gear R3 is drivably connected to a torque output shaft 124, which is drivably connected to vehicle traction wheels 22 through powertrain 20 shown in FIG. 1. Gearset 120 is an underdrive ratio gearset arranged in series with respect to compound gearset 121. Typically, transmission 18 preferably includes a lockup or torque converter bypass clutch, as shown at 125, to directly connect transmission input shaft 118 to engine 12 after a torque converter torque multiplication mode is completed and a hydrokinetic coupling mode begins.

FIG. 2 also shows a transmission range control module 151 and a powertrain control module 152 which collectively constitute controller 25. Transmission range control module 151 is connected to transmission 18 by a shift cable (not labeled). Transmission range control module 151 replaces a mechanical shifter that was used to shift transmission from one range to another. A transmission control mechanism such as Gear Shift Module 156 is provided to select a transmission shift-range. One possible implementation would be various buttons 158 each representing a different transmission range. In this type of implementation, Gear Shift Module 156 is used to select several ranges, such as Park where the transmission output is locked to prevent the vehicle from moving, Neutral where the transmission allows vehicle 10 to be moved freely, such as when being towed, Reverse where transmission 18 allows the vehicle to, move backwards, and one or more Drive ranges that enable forward motion of the vehicle. Gear Shift Module 156 is also shown to include a Sport range. The Sport range is similar to the Drive range but will cause transmission 18 to shift forward ratios based on inputs from upshift and downshift switches (not shown) actuated by the driver. Gear Shift Module buttons 158 are labeled with letters generally corresponding to the several transmission ranges and as such "P", "R", "N", "D", and "S" are shown in FIG. 2. Once transmission 18 has entered one of the ranges, a message center 160 shows the driver which range was entered. Additionally, Gear Shift Module 156 accepts signals from an override button 165 that will enable shifting to a Neutral Hold mode in emergencies and an info button 170, which causes message center 160 to provide additional information to the driver. Preferably, override button 165 has a cover 175 that protects override button 165 from accidentally being pushed.

The Park range can preferably be entered in many ways. In particular, the driver can select Park by pushing the "P" button and powertrain control module 152 then checks to see if vehicle 10 is traveling below an extremely low speed or stationary and, if so, instructs transmission control module 151 to shift transmission 18 into Park. Alternatively, when the driver ignition switch is turned to off, engine 12 powertrain control module 152 automatically instructs transmission control module 151 to shift transmission 18 into Park, thus enabling a "Return to Park" feature. Similarly, when the driver opens door 32 after unbuckling belt 41, sensors 30 and 40 will signal powertrain control module 152 which automatically instructs transmission control module 51 to shift transmission 18 into Park, thus once again enabling a "Return to Park" feature. The Reverse range is entered by pushing the button labeled "R", at which point powertrain control module 152 automatically instructs transmission control module 151 to shift transmission 18 into Reverse, thus enabling vehicle 10 to move backward. In the exemplary transmission embodiment shown, the Reverse range is established by applying low-and-reverse brake D and friction element B. The Neutral range is entered by a single push of the "N" button on gear shift control module 156 or by a push of the "P" button when vehicle 10 is traveling too fast to safely enter the Park mode. In either case, powertrain control module 152 instructs transmission control module 151 to shift transmission 18 into Neutral and transmission 18 allows wheels 22 to rotate freely.

The Drive or Sport ranges are entered by a single push of the "D" or "S" buttons respectively. Optionally a Low or "L" range (not shown) can be made available to keep transmission 18 in low gears during forward motion of vehicle 10. When in Drive in the exemplary transmission shown, during operation in the first four forward driving ratios, carrier P1 is drivably connected to sun gear S3 through shaft 126 and forward friction element A. During operation in the third ratio, and fifth ratio, direct friction element B drivably connects carrier 22 to shaft 127, which is connected to large pitch diameter sun gear S2. During operation in the fourth, fifth and sixth forward driving ratios, overdrive friction element E connects turbine shaft 118 to compound carrier 123 through shaft 128. Friction element C acts as a reaction brake for sun gear S2 during operation in, second and sixth forward driving ratios. During operation of the third forward driving ratio, direct friction element B is applied together with, forward friction element A. The elements of gearset 121 then are locked together to effect a direct driving connection between shaft 128 and output shaft 126. The torque output side of forward friction element A is connected through torque transfer element 129 to the torque input side of direct friction element B during forward drive. The torque output side of direct friction element B, during forward drive, is connected to shaft 127 through torque transfer element 130. More details of this type of transmission arrangement are found in U.S. Pat. No. 7,216,025, which is hereby incorporated by reference.

Figure 3:
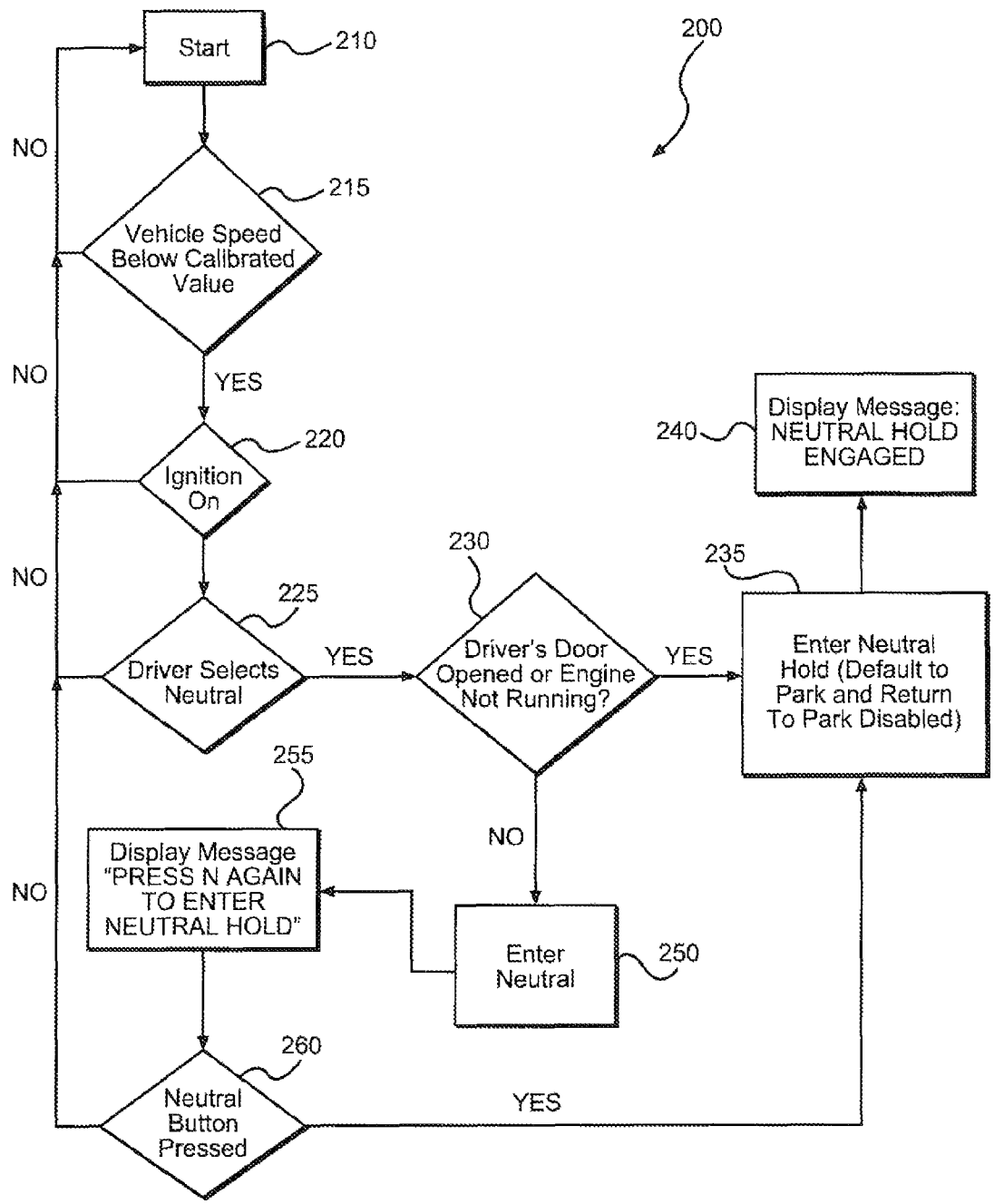
FIG. 3 is a flowchart showing a control routine employed in the system of FIG. 1 used to enter the Neutral Hold mode according to a preferred embodiment of the invention.

FIG. 3 is a flow chart showing a preferred method 200 of entering a Neutral Hold mode in accordance with the invention. Generally, the Neutral Hold mode is entered with sequential Neutral button presses within a calibrated window or by making a valid Neutral button press with driver's door 32 open. When vehicle 10 is in Neutral Hold mode, the "Return to Park" function is deactivated so that vehicle 10 may be put on a conveyor or the like, such as at a car washing facility. Preferred method 200 of entering Neutral Hold starts at step 210 and is implemented by controller 25. Next, at step 215, controller 25 checks to determine the speed of vehicle 10 and determine if the speed is below a calibrated value. Controller 25 will reject a request to enter Neutral Hold mode at high speeds and simply return to start 210 because such a request is assumed to be in error. However, if vehicle 10 is traveling slow enough, almost stopped, then controller 25 moves to step 220 and checks ignition switch 47 to determine if ignition switch 47 is on and if engine 12 is not running. If ignition switch 47 is off at 220, controller 25 simply returns to start 210. If ignition switch 47 is "on", controller 25 proceeds to step 225 and detects whether or not the driver selects Neutral for a first time. If the Neutral button "N" is pressed while driver's door 32 is open or engine 12 is not running as shown at 230, then controller 25 enters Neutral Hold mode at 235 and the 'Return to Park' feature is disabled. In this situation, transmission 18 will stay in Neutral and not shift to Park upon detecting that a driver has exited vehicle 10. Also, controller 25 instructs message center 160 to show the message "NEUTRAL HOLD ENGAGED" or some other similar message at step 240 to let the driver know that "Neutral Hold' mode has been successfully entered. If the Neutral button "N" is pressed a first time when driver's door 32 is closed and engine 12 is running then Neutral is entered at step 250 and a message is displayed at step 255 on message center 160, such as "PRESS N AGAIN TO ENTER NEUTRAL HOLD" or some other similar message, to let the driver know that button "N" should be pressed again to enter Neutral Hold mode. Controller 25 will cease to display the messages in steps 240 and 255 upon detecting that battery 15 in vehicle 10 is providing power below a threshold level. At step 260, controller 25 detects when the transmission control mechanism has been used a second time to select Neutral within a set time, such as a few seconds, after being was used the first time. Then controller 25 proceeds to step 235 and enters Neutral Hold mode, otherwise controller 25 returns to step 210. The Neutral Hold mode will be maintained even when battery 15 in vehicle 10 ceases to provide power.

Figure 4:
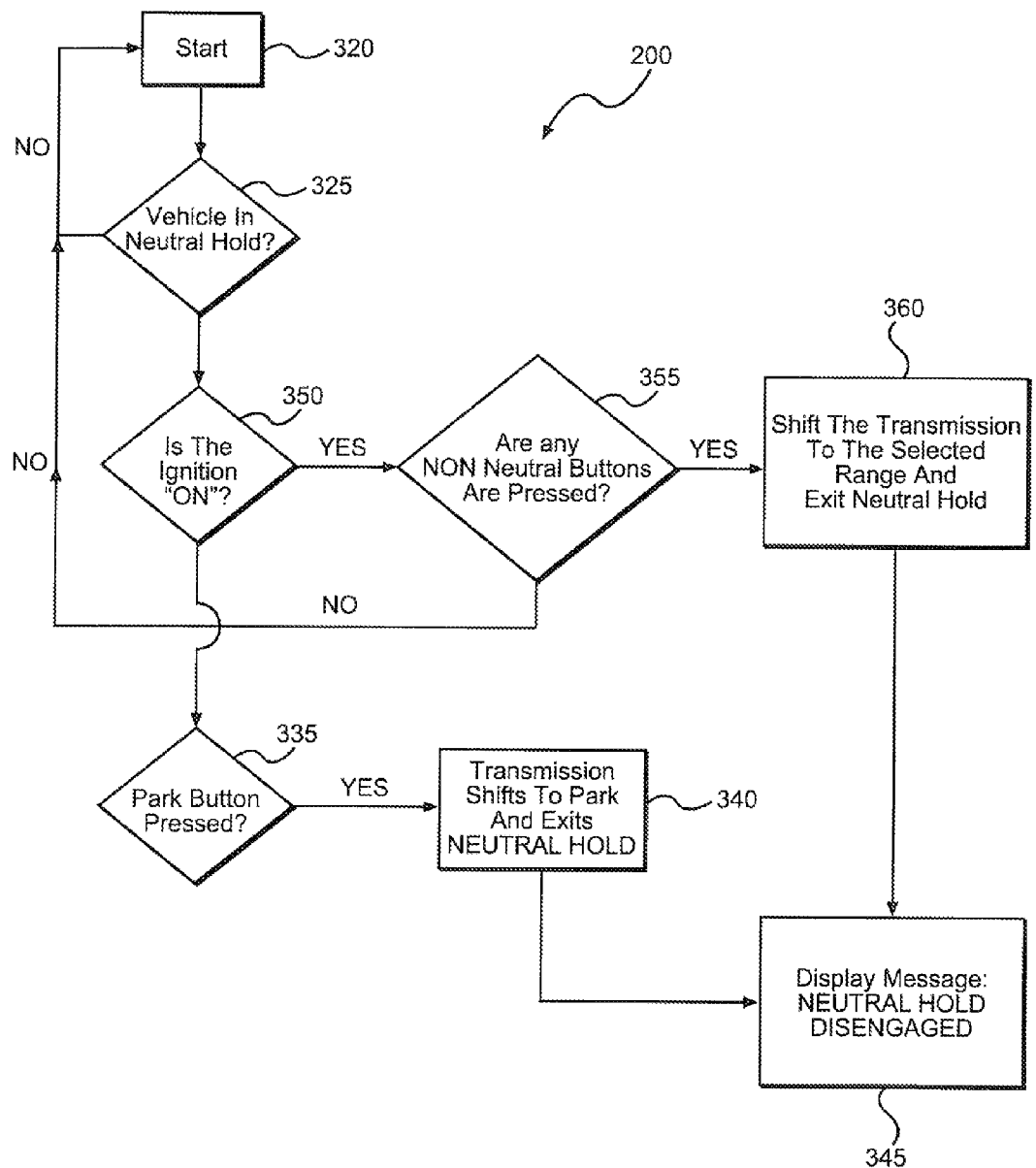
FIG. 4 is a flowchart showing a control routine employed in the system of FIG. 1 used to exit the Neutral Hold mode according to a preferred embodiment of the invention.

FIG. 4 shows a preferred method 300 of exiting the Neutral Hold mode. Starting at step 320, controller 25 first checks at step 325 to determine if vehicle 10 is in Neutral Hold mode. If vehicle 10 is not in Neutral Hold mode, then controller 25 returns to step 320. If vehicle 10 is in Neutral Hold mode, then controller 25 follows one of two preferred methods depending whether or not ignition switch 47 is on. In the first method, if ignition switch 47 is off, controller 25 checks to see if Park button "P" is pressed at 335 and, if so, shifts transmission 18 to Park at step 340. Controller 25 also disengages Neutral Hold mode and, at 345, displays a message "NEUTRAL HOLD DISENGAGED" or some other similar message on message center 160. In the second method, if ignition switch 47 is "on", controller 25 checks to see if any Non-neutral buttons are pressed at step 355. If so, transmission 18 is shifted to the selected range and the Neutral Hold mode is exited at step 360, with controller 25 then proceeding to step 345. Preferably, message center 160 is always powered to indicate to the driver what mode or transmission selection controller 25 is presently executing. If the answer at step 355 is not affirmative, then controller 25 proceeds back to either step 320 or step 325.

From the above description of the preferred embodiments of the invention, one can see how a driver can advantageously enter a Neutral Hold mode during certain user needs, such as when vehicle 10 is to be washed. If vehicle 10 were to return to park automatically when on a conveyor, damage would occur. Specifically, vehicle 10, when in Neutral Hold mode, may be put on a conveyor because the return to park features will have been disabled.

Although described with reference to preferred embodiments of the invention, it should be readily understood that various changes and/or modifications could be made to the invention without departing from the spirit thereof. For instance, numerous minor variations to the preferred methods of entering and exiting Neutral Hold could be made without changing the inventive concept. In addition, although push buttons are employed in disclosed embodiments, various other selecting arrangements including numerous switches could be employed. In general, the invention is only intended to be limited by the scope of the following claims.

The invention claimed is:

1. A method of providing a neutral hold mode in a shift-by-wire transmission having an automatic return-to-park feature in a vehicle, comprising:

detecting when a transmission control mechanism has been used a first time to select neutral;

after detecting when the transmission control mechanism has been used to select neutral, displaying a message requesting that the transmission control mechanism be used again to select neutral; and entering, with a controller, a neutral hold mode upon detecting when the transmission control mechanism has been used a second time to select neutral wherein the transmission will stay in neutral and not shift to park upon detecting that a driver has exited the vehicle.

2. The method of claim 1, wherein the neutral hold mode is only entered if the vehicle is moving at a speed that is below a calibrated value.

3. The method of claim 1, further comprising:
displaying a message that the transmission has entered a neutral hold mode.

4. The method of claim 1, further comprising:
ceasing to display the message upon detecting that a battery in the vehicle is providing power below a threshold level.

5. The method of claim 1, further comprising:
maintaining the neutral hold mode when a battery in the vehicle ceases to provide power.

6. The method of claim 1, further comprising:
leaving the neutral hold mode when the transmission control mechanism is used to select a gear other than neutral.

7. A method of providing a neutral hold mode in a shift-by-wire transmission having an automatic return-to-park feature in a vehicle powered by an engine, comprising:
detecting when a door of the vehicle is open; and
entering, with a controller, a neutral hold mode upon detecting when a transmission control mechanism has been used to select neutral when the door is open or when an ignition switch is on and the engine is off and wherein the transmission will stay in neutral and not shift to park upon detecting that a driver has exited the vehicle.

8. The method of claim 7, further comprising:
displaying a message that the transmission has entered a neutral hold mode.

9. The method of claim 8, further comprising:
ceasing to display the message upon detecting that a battery in the vehicle is providing power below a threshold level.

10. The method of claim 7, further comprising:
maintaining the neutral hold mode when a battery in the vehicle ceases to provide power.

11. The method of claim 7, further comprising:
leaving the neutral hold mode when the transmission control mechanism is used to select a gear other than neutral.

12. A system for providing a neutral hold mode in a vehicle including a door and a shift-by-wire transmission having an automatic return-to-park feature comprising:
a transmission control mechanism for controlling the transmission;
a detector for detecting when the transmission control mechanism has been used a first time to select neutral;
a display for displaying a message requesting that the transmission control mechanism be used again to select neutral after detecting when the transmission control mechanism has been used to select neutral; and
a controller configured to enter a neutral hold mode upon detecting that the door was open when the transmission control mechanism was used to select neutral or upon detecting when the transmission control mechanism has been used a second time to select neutral and configured to maintain the transmission in neutral and not shift the transmission to park upon detecting that a driver has exited the vehicle.

13. The system of claim 12, further comprising:
a display for displaying a message that the transmission has entered a neutral hold mode.

14. The system of claim 13, wherein the vehicle further includes a battery and the controller is further configured to cease displaying the message upon detecting that the battery is providing power below a threshold level.

15. The system of claim 12, wherein the vehicle further includes a battery and the controller is further configured to maintain the neutral hold mode when the battery ceases to provide power.

16. The system of claim 12, wherein the controller is further configured to leave the neutral hold mode when the transmission control mechanism is used to select a range other than neutral.

17. The system of claim 12, further comprising an engine and an ignition switch and wherein the controller is further configured to enter the neutral hold mode when the ignition switch is on and the engine is off.

* * * * *